July 4, 1967

E. C. FREBER 3,329,245

CLUTCH DRUM WITH RESILIENT COUPLING

Filed April 9, 1965

INVENTOR
ELMER C. FREBER

BY Alfred W Petchaft

ATTORNEY

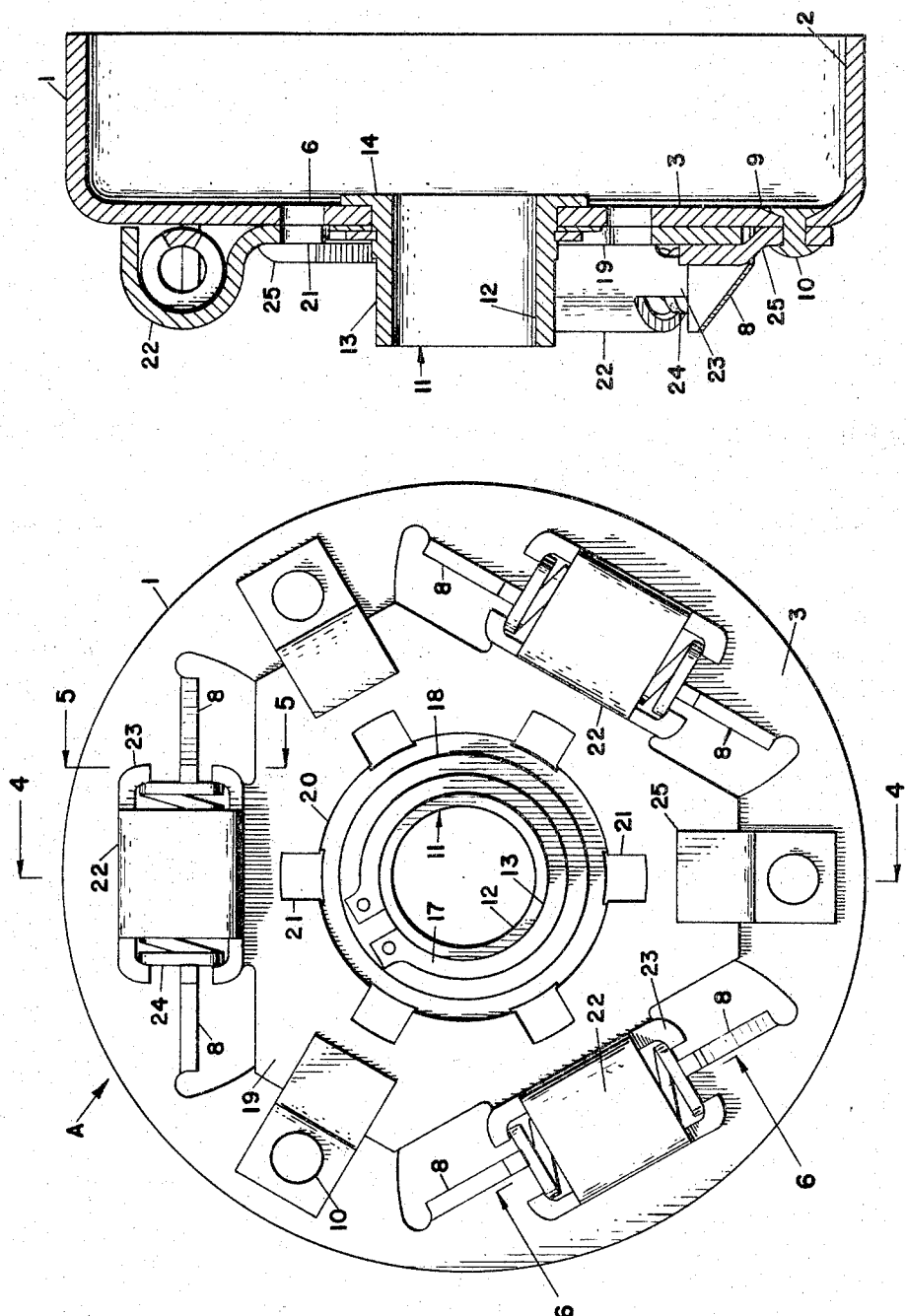

July 4, 1967 E. C. FREBER 3,329,245
CLUTCH DRUM WITH RESILIENT COUPLING
Filed April 9, 1965 3 Sheets-Sheet 3

INVENTOR
ELMER C. FREBER
BY
Alfred W. Petchaft
ATTORNEY

United States Patent Office 3,329,245
Patented July 4, 1967

3,329,245
CLUTCH DRUM WITH RESILIENT COUPLING
Elmer C. Freber, St. Louis, Mo., assignor to Marquette Tool and Die Company, St. Louis, Mo., a corporation of Missouri
Filed Apr. 9, 1965, Ser. No. 446,993
3 Claims. (Cl. 192—55)

This invention relates in general to new and useful improvements in clutch drums and, more particularly, to a full floating centrifugal clutch drum having shock reducing characteristics.

During recent years small internal combustion engines have experienced a wide range of applications. A large number of such engines are currently manufactured for lawn mowers, motorcycles and scooters, golf carts and small delivery vehicles. Such uses, of course, require that the engine or drive train attached thereto be provided with some means of disengaging the engine from the wheels or other driven components of the device. For this purpose it is common practice to use small centrifugal clutches having internal radially moveable shoes, which when actuated by centrifugal force, bear against a drum operatively connected to the driven components. Centrifugal clutches are comparatively economical to manufacture, but tend to grab and thus apply power suddenly to the driven parts. This, of course, will impose undue strains on the mechanism. Furthermore, conventional centrifugal clutches transmit the substantial torsional vibrations which are inherent to engines having few cylinders and in so doing increase the wear on such driven components as gearing.

It is, therefore, the primary object of the present invention to provide a full floating centrifugal clutch drum which substantially cushions the shock caused by engagement of the clutch components.

It is a further object of the present invention to provide a full floating centrifugal clutch drum of the type stated which is rugged in construction and is economical to manufacture.

It is another object of the present invention to provide a centrifugal clutch drum of the type stated which reduces the transmission of torsional vibrations.

It is still another object of the present invention to provide a centrifugal clutch drum of the type stated having retaining means for holding cushion springs securely therein so as to prevent the springs from becoming dislodged.

With the above and other objects in view, our invention resides in the novel features of form, construction, arrangement, and combination of parts presently described and pointed out in the claims.

In the accompanying drawings (three sheets):

FIG. 2 is a front elevational view of a clutch drum constructed in accordance with and embodying the present invention;

FIG. 4 is a sectional view taken along line 4—4 of FIG. 2;

Figure 1:
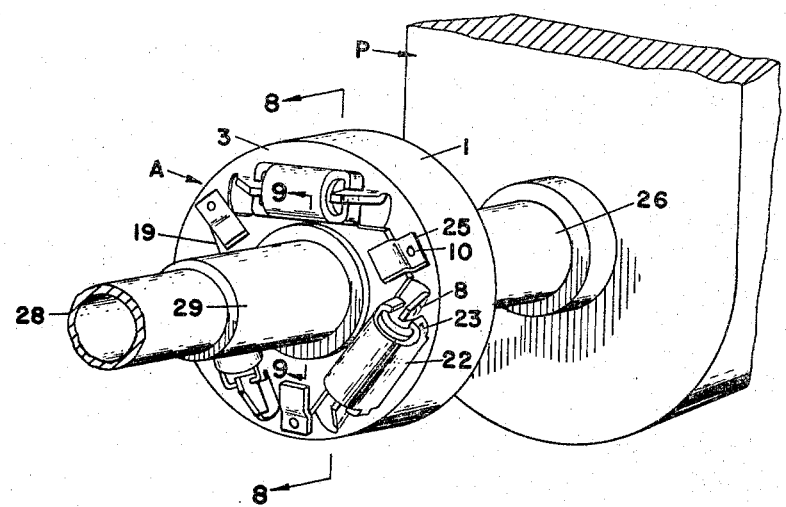
FIG. 1 is a fragmentary perspective view of a clutch drum constructed in accordance with and embodying the present invention; the clutch drum being operatively mounted on the drive shaft of an internal combustion engine and having a driven shaft in operative engagement therewith.
Figure 8:
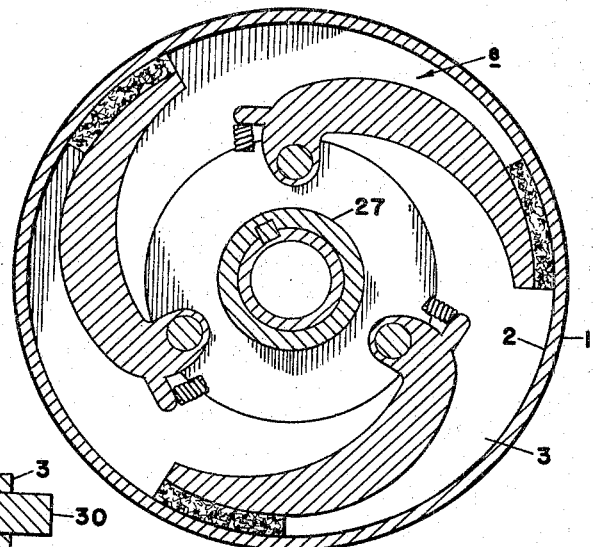
FIG. 8 is a sectional view taken along line 8—8 of FIG. 1 and showing the clutch elements in engagement with the clutch drum of the present invention.
Figure 9:
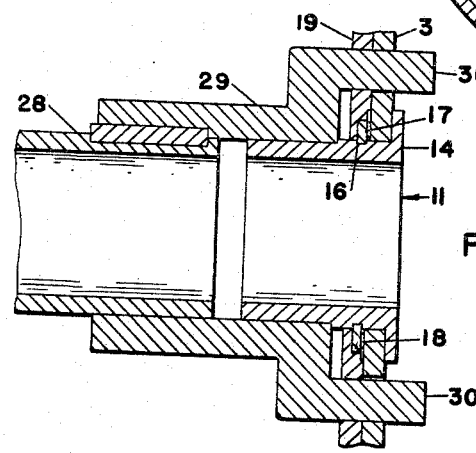
FIG. 9 is a fragmentary sectional view taken axially along shaft 28 in FIG. 1.
Figure 3:
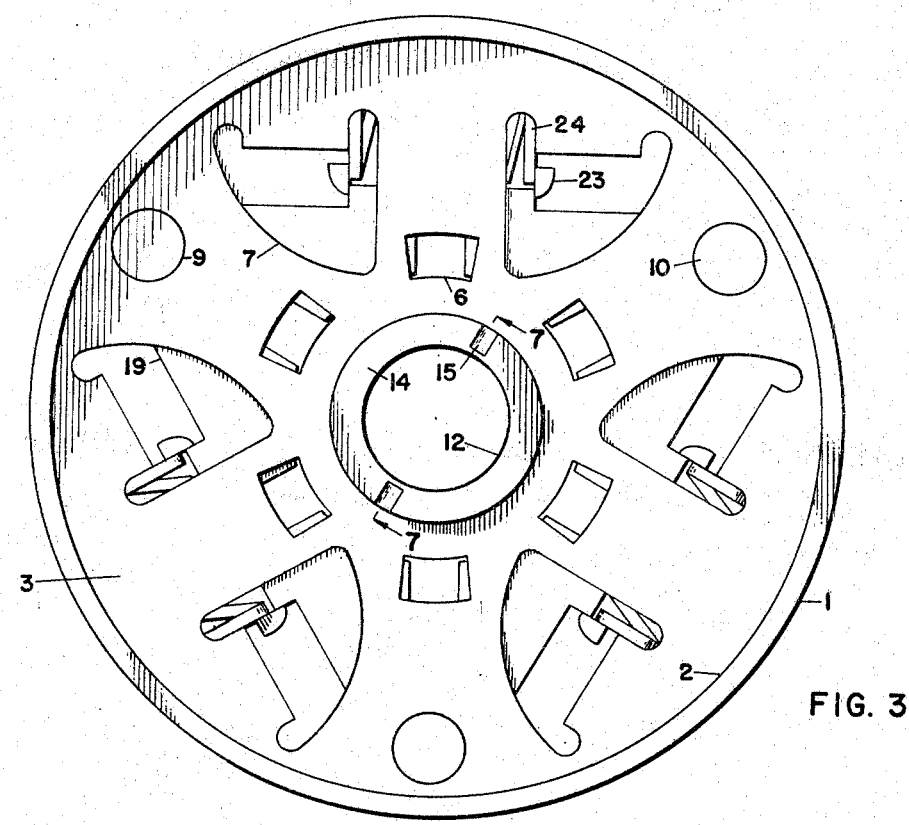
FIG. 3 is a rear elevational view of a clutch drum constructed in accordance with and embodying the present invention.
Figure 5:
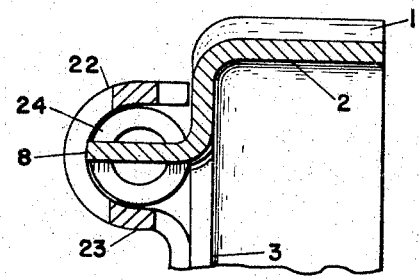
FIGS. 5 and 6 are fragmentary sectional views taken along lines 5—5, 6—6 of FIG. 2.
Figure 7:
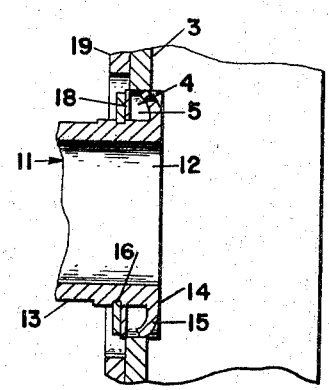
FIG. 7 is a fragmentary sectional view taken along line 7—7 of FIG. 3.
Figure 6:
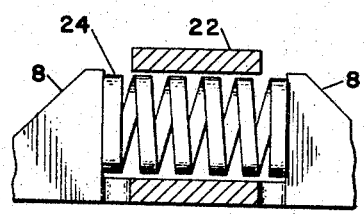

Referring now in more detail and by reference characters to the drawings, which illustrate a preferred embodiment of the present invention, A designates a centrifugal clutch drum comprising a cylindrical collar or rim 1 having an inwardly presented annular friction surface 2. Formed integrally with and extending transversely across the rim 1 is an end wall 3 which is provided with a circular aperture 4 having a pair of diametrically opposed notches 5. Encirclingly disposed around aperture 4 in wall 3 are a plurality of arcuate apertures 6. Outwardly of the apertures 6, the end wall 3 is punched and stamped to provide three pairs of quadrant-shaped apertures 7 arranged symmetrically about radii which are 120° apart. The metal which is punched out of the apertures is bent outwardly perpendicular to the end wall 3 in the formation of paired lugs or ears 8. Near its outer perimeter and equally spaced between each pair of ears 8 the wall 3 is drilled and countersunk on the inner face thereof in the provision three apertures 9 which accept the flat-head rivets 10, all for purposes presently more fully appearing. It should be understood, that the selection of three pairs of ears 8, and three apertures 9 is for purposes of illustration and not by way of limitation, for it will presently become obvious that any number of apertures 9 and pairs of ears 8 may be used.

Provided for snug fitting disposition within the aperture 4 is sleeve 11 having an internal bearing surface 12 and being externally turned down at one end in the provision of a diametrally reduced collar portion 13. At its other end the sleeve 11 is provided with an outwardly projecting annular retention flange 14 which is notched and stamped in the formation of axially projecting lugs 15 which fit snugly within the notches 5 and thereby prevent the sleeve 11 from rotating within aperture 4. Sleeve 11 is provided in close proximity to flange 14 with an annular groove 16 which accepts a C-ring 17 for axial retention of the sleeve 11 within aperture 4 of end wall 3. To provide a tight fit and to prevent any axial movement of the sleeve 11 in the aperture 4, a spring washer 18 is disposed between the outer face of wall 3 and the C-ring 17.

Mounted facewise upon the end wall 3 as illustrated in FIGS. 2 and 4 is a substantially triangular floating plate 19 having truncated corner margins and a centrally disposed circular aperture 20 which is diametrally sized to receive collar portion 13 of sleeve 11, C-ring 17, and spring washer 18 and is provided with a plurality of radially extending notches 21 which register with but are slightly less in perimetral length than the arcuate apertures 6 of wall 3. The side margins of triangular floating plate 19 are provided with outwardly projecting spring retainers 22 having opposed inwardly projecting tabs 23 on either end thereof, the length between the tabs 23 on either end being substantially equal to the distance between the corresponding pair of opposed ears 8. Each of the retainers 22 carry a coiled compression spring 24 which is prevented from axial movement therein by the tabs 23. When the floating plate 19 is operatively emplaced on the outer surface of wall 3 as best seen in FIG. 2, each of the retainers 22 with a spring 24 carried therein will be operatively disposed between ears 8 which provide an abutment for the annular ends of springs 24.

The floating plate 19 is held to the end wall 3 by mounting clips 25 which, being stepped to accommodate the thickness of the floating plate 19, allow it to rotate relative to the driven drum 1 within the limits permitted by the springs 24. The mounting clips 25 are securely held to the surface of end wall 3 by rivets 10. Again it should be noted that clutch drum A can be constructed so as to utilize more or less than three springs 24 and spring retainers 22, the number three being only chosen for purposes of illustration, and not by way of limitation.

In operation clutch drum A is adapted to be used with an engine P or other suitable power source having a power shaft 26 extending therefrom. Operatively secured to power shaft 26 is a drive collar 27 operaively provided with conventional centrifugal clutch elements e adapted to swing outwardly when the shaft 26 is rotated at sufficient speed and engage the interior surface 2 of the collar or rim 1. Since the centrifugal clutch element e may be of any suitable conventional design, they are not described or illustrated in detail herein.

Provided for rotation with clutch drum A, as best seen in FIG. 1, is driven shaft 28 having rigidly secured to one end thereof a sleeve 29 which is internally diametrically sized to fit slidably over the collar portion 13 of sleeve 11. The free annular end of sleeve 29 is provided with a plurality of axially projecting dogs 30 which register with and engage the notches 21 of drive plate 19, extending therethrough and terminating in proximity to the apertures 6 of end wall 3.

Thus when power shaft 26 is rotated by engine P or other suitable power source, drive collar 27 which is securely locked thereto will also rotate whereby to cause the centrifugal clutch elements e to swing outwardly and bear against the friction surface 2. The clutch elements e will impart rotation to the clutch drum A and power will be transmitted to the driven shaft 28 through the floating plate 19.

If the coefficient of friction between clutch elements e and friction surface 2 is of such value as to cause the clutch elements e to more or less grab upon contacting the friction surface 2, the floating plate 19 will rotate slightly relative to the collar or rim 1 against the cushioning springs 24, thereby absorbing the shock and preventing possible destruction of members of the drive train. Similarly, any shocks received by the drive train will not be transferred through the clutch and into the engine P. Moreover, the springs 24 will absorb and substantially reduce the torsional vibrations present in the drive shaft 26, and thereby increase the life of other members of the drive train such as the transmission gearing.

It should be understood that changes and modifications in the form, construction, arrangement, and combination of the several parts of the clutch drum may be made and substituted for those herein shown and described without departing from the nature and principle of my invention.

Having thus described my invention, what I claim and desire to secure by Letters Patent is:

1. A clutch drum comprising a rim having an annular drum-like friction surface and an end wall extending across one annular end margin of the friction surface, a bushing fitted into the end wall concentric with the friction surface for reception of a power-transmitting shaft, pairs of ears arranged in circumferentially spaced relation on the end wall symmetrical about spaced radii, each pair of ears including first and second individual ears projecting outwardly from the drum in substantially coplanar relation to one another, the first and second ears having opposed end faces located perpendicular to the end wall, a coiled spring interposed between each pair of ears against the outwardly presented face of the end wall, the springs having their ends in engagement with the end faces of the ears, a floating plate mounted in facewise abutment against the outwardly presented surface of the end wall, spring retainers formed on the floating plate, each spring retainer including an inverted trough-like portion which covers a substantial portion of a spring so that each spring is encased between the end wall of the rim and a spring retainer of the floating plate, opposed tabs formed on the ends of the spring retainers and extending toward the ears, the tabs on the retainers being longitudinally spaced apart a distance substantially equivalent to the distance between the opposed end faces of the ears whereby the ends of the springs also engage the tabs, and retention means for holding the floating plate in facewise abutment with the end wall, yet allowing limited rotational movement of the floating plate with respect to the rim.

2. A clutch according to claim 1 wherein the retention means are clips which are rigidly secured to the end wall of the rim intermediate the spring retainers and extend outwardly from the end wall over the outwardly presented surface of the floating plate whereby the floating plate is free for limited rotation with respect to the rim but cannot be withdrawn therefrom.

3. A clutch drum comprising a rim having an annular drum-like friction surface and an end wall extending across one annular end margin of the friction surface, a bushing fitted into the end wall concentric with the friction surface for reception of a power-transmitting shaft, the end wall having a plurality of circumferentially spaced arcuate apertures located in surrounding relation to the bushing, pairs of ears arranged in circumferentially spaced relation on the end wall symmetrical about spaced radii, each pair of ears including first and second individual ears projecting outwardly from the drum in substantially coplanar relation to one another, the first and second ears having opposed end faces located perpendicular to the end wall, a coiled spring interposed between each pair of ears against the outwardly presented face of the end wall, the springs having their ends in engagement with the end faces of the ears, a floating plate mounted in facewise abutment against the outwardly presented surface of the end wall, and having a plurality of notches which register with the arcuate apertures in the end wall, the circumferential length of each notch being less than the circumferential length of its corresponding arcuate aperture and the end margins of the arcuate apertures being located beyond the end margins of the notches, spring retainers formed on the floating plate, each spring retainer including an inverted troughlike portion which covers a substantial portion of a spring so that each spring is encased between the end wall of the rim and a spring retainer of the floating plate, opposed tabs formed on the ends of the spring retainers and extending toward the ears, the tabs on the retainers being longitudinally spaced apart a distance substantially equivalent to the distance between the opposed end faces of the ears whereby the ends of the springs also engage the tabs, retention means for holding the floating plate in facewise abutment with the end wall, yet for allowing limited rotational movement of the floating plate with respect to the rim, and a connecting sleeve provided at its one end with a plurality of axially extending dogs which project into the notches of the floating plate whereby the sleeve rotates with the floating plate, but is isolated from the rim by the springs.

References Cited

UNITED STATES PATENTS

| 1,446,838 | 2/1923 | Danielson | 192—55 X |
| 1,753,365 | 4/1930 | Daukus | 192—55 X |
| 2,158,244 | 5/1939 | Mistetta et al. | 192—68 |
| 3,265,172 | 8/1966 | Atsumi et al. | 192—55 |

FOREIGN PATENTS

| 1,576 | 1/1909 | Great Britain. |

BENJAMIN W. WYCHE III, *Primary Examiner.*